United States Patent [19]

Hamada

[11] 3,919,482

[45] Nov. 11, 1975

[54] FM RECEIVER NOISE SUPPRESSION CIRCUIT

[75] Inventor: Osamu Hamada, Tokyo, Japan

[73] Assignee: Sony Corporation, Tokyo, Japan

[22] Filed: Dec. 6, 1971

[21] Appl. No.: 205,072

[30] Foreign Application Priority Data

Dec. 11, 1970 Japan .............................. 45-110881

[52] U.S. Cl. ............ 179/15 BT; 325/348; 325/478

[51] Int. Cl.$^2$ .......................................... H04H 5/00

[58] Field of Search ........ 179/15 BT; 325/348, 403, 325/478

[56] References Cited

UNITED STATES PATENTS

| | | | |
|---|---|---|---|
| 3,161,727 | 12/1964 | Von Recklinghausen | 179/15 BT |
| 3,296,379 | 1/1967 | Von Recklinghausen | 179/15 BT |
| 3,323,066 | 5/1967 | Kurtz | 325/403 |
| 3,329,773 | 7/1967 | Ochi | 179/15 BT |
| 3,374,437 | 3/1968 | Heald | 325/478 |
| 3,568,068 | 3/1971 | Russell | 325/348 |
| 3,569,633 | 3/1971 | Brahman | 179/15 BT |
| 3,588,705 | 6/1971 | Paine | 325/348 |
| 3,634,626 | 1/1972 | Staley | 179/15 BT |
| 3,662,113 | 5/1972 | Von Recklinghausen | 179/15 BT |
| 3,728,491 | 4/1973 | Fichtner | 179/15 BT |

FOREIGN PATENTS OR APPLICATIONS

| | | | |
|---|---|---|---|
| 1,280,328 | 2/1966 | Germany | 179/15 BT |

*Primary Examiner*—Kathleen H. Claffy
*Assistant Examiner*—Thomas D'Amico
*Attorney, Agent, or Firm*—Hill, Gross, Simpson, Van Santen, Steadman, Chiara & Simpson

[57] ABSTRACT

In an FM receiver having a stereo demodulator circuit supplied with a composite stereophonic signal from which right and left channel audio signals, are reproduced, a noise suppression circuit which includes a pair of gate circuits connected to a pair of output stages of the demodulator circuit, a noise signal detecting circuit connected to an output stage of an FM discriminator and a control signal producing circuit supplied with a noise signal derived from the detecting circuit to produce a control signal. The gate circuits are controlled by the control signal to cut off audio signals from the demodulator circuit in the presence of a noise signal, thereby momentarily to cause the FM receiver not to reproduce the stereophonic signal.

14 Claims, 10 Drawing Figures

INVENTOR
OSAMU HAMADA

BY
Hill Sherman Meroni Gross & Simpson
ATTORNEY

INVENTOR
OSAMU HAMADA

BY

Hill Sherman Meroni Gross & Simpson

ATTORNEY

INVENTOR
OSAMU HAMADA

BY

Hill Sherman Meroni Gross & Simpson

ATTORNEY

INVENTOR
OSAMU HAMADA

BY

Hill, Sherman, Meroni, Gross & Simpson

ATTORNEY

FM RECEIVER NOISE SUPPRESSION CIRCUIT

BACKGROUND OF THE INVENTION

1. Field of the Invention

This invention relates to an FM receiver, and more particularly to an FM receiver provided with control means in audio channels to cut off the channels when a noise signal appears.

2. Description of the Prior Art

As is already known in the art, an FM receiver is capable of receiving broadcast waves with little noise due to the so-called limiter effect. Even with a receiver of excellent limiter characteristics, however, it is impossible to remove completely pulse-like noises such as ignition noises generated by a spark plug of car engines and by various electric instruments. Generally, ignition noise or impluse noise might be said to be a shock wave which is produced by a spark discharge of a current when it flows in the air. The frequency component contained in the noise is widely distributed from the MF to VHF band and one portion thereof is received by the FM receiver through an antenna which disturbs good reception of the stereo signal.

During reception of an FM wave, an impulse noise mixed therein causes a change in the amplitude of the FM wave but this amplitude change is removed by a limiter. However, where the peak value of the impulse noise exceeds the broadcast wave, the wave is suppressed by the capture effect and, at the same time, the wave is frequency-and/or phasemodulated by the noise. Accordingly, when such a signal is demodulted, the noise component is contained in the audio signal, making good reception of desired signals impossible.

In order to eliminate such an impulse noise, a proposal has heretofore been made to employ gate circuits at the output stage of the stereo demodulator and controlling the gate circuits by a gate signal produced in accordance with a noise signal derived from a noise detecting circuit connected to the stage preceding an intermediate-frequency amplifier. With such an arrangement, at the arrival of the inpulse noise, the gate circuits are momentarily cut off for a period of time corresponding to the duration of the noise to cut off the signal section temporarily. Namely, the signal section is cut off, for example, for about 1 microsecond in the case of the noise being one shot of a spark discharge and for about 10 microseconds in the case of several shots of noise similar to ignition noises generated from a car engine. Since the cutoff period is so short, the noise can be removed without impairing sound effects.

However, such a prior method has the following defect. Namely, when a broadcast wave or more than 100dB, for example, a television signal is received, there is the possibility that if the gain of a noise amplifier is great, the television signal is detected as a noise although the television is not reproduced as a noise with an FM receiver, while if the gain is small, no noise can be detected. Since the noise is distributed over a wide frequency range, it is possible to increase the noise detection sensitivity by selecting the gain of the noise detector circuit small and its bandwidth wide. However, in the presence of an electric field of more than 100dB, it is difficult to distinguish noise from such a field. Further, a method has been proposed to detect a noise signal by connecting the noise detector circuit to a relatively prior stage portion of an intermediate-frequency amplifier having many stages.

In such a noise suppresser circuit the noise detector circuit is connected to the prior stage of the intermediate-frequency amplifier which has an insufficient limiter effect, so that when beat interference occurs between the channel being received and an adjacent one, it is impossible to discriminate whether the interference is noise or beat interference because the beat component is an amplitude-modulated one.

SUMMARY OF THE INVENTION

This invention is directed to a noise suppression circuit for an FM receiver in which a noise detector circuit is connected to an intermediate stage of a multistage intermediate-frequency amplifier, or a noise detector circuit for detecting the noise of a frequency higher than a predetermined one is connected to an output stage of an FM discriminator, or both, of such noise detector circuits are provided, thereby to cut off audio channels momentarily in response to a noise signal detected.

Accordingly, one object of this invention is to provide an FM receiver adapted for effective removal of an impulse noise signal.

Another object of this invention is to provide an FM receiver in which a Q-damp means is provided in a switching signal producing circuit with which when a noise signal is detected resonance of a resonance circuit included in the switching signal producing circuit is altered to prevent that a switching signal disturbed by the noise signal is supplied to a stereo demodulator.

Another object of this invention is to provide an FM receiver which is provided with means for detecting a noise including frequency components exceeding a predetermined value, thereby to avoid faulty operation which would otherwise be caused by beat interference or white noise.

Another object of this invention is to provide an FM receiver which is adapted to perform in such a way that even if the field intensity of a signal desired to select is low, a noise can be detected effectively, and accordingly the noise can be removed.

Still another object of this invention is to provide an FM receiver in which a noise detector circuit is connected to an intermediate stage of an intermediate-frequency amplifier and a noise signal mixed in a signal being received is effectively removed by utilizing a change in the amplitude of a signal from the intermediate frequency amplifier which is caused by the noise signal.

Still another object of this invention is to provide an FM receiver which has a first noise detector circuit for detecting an intermediate-frequency signal derived from an intermediate stage of an intermediate-frequency amplifier to pick up an amplitude change of the intermediate-frequency signal as a noise signal and a second noise detector circuit for picking up as a noise signal a frequency component higher than a predetermined frequency and in which the both of the noise detector circuits are automatically changed over to remove the noise signal.

Other objects, features and advantages of this invention will become apparent from the following description taken in conjunction with the accompanying drawings.

DESCRIPTION OF THE PREFERRED EMBODIMENTS

Figure 1:
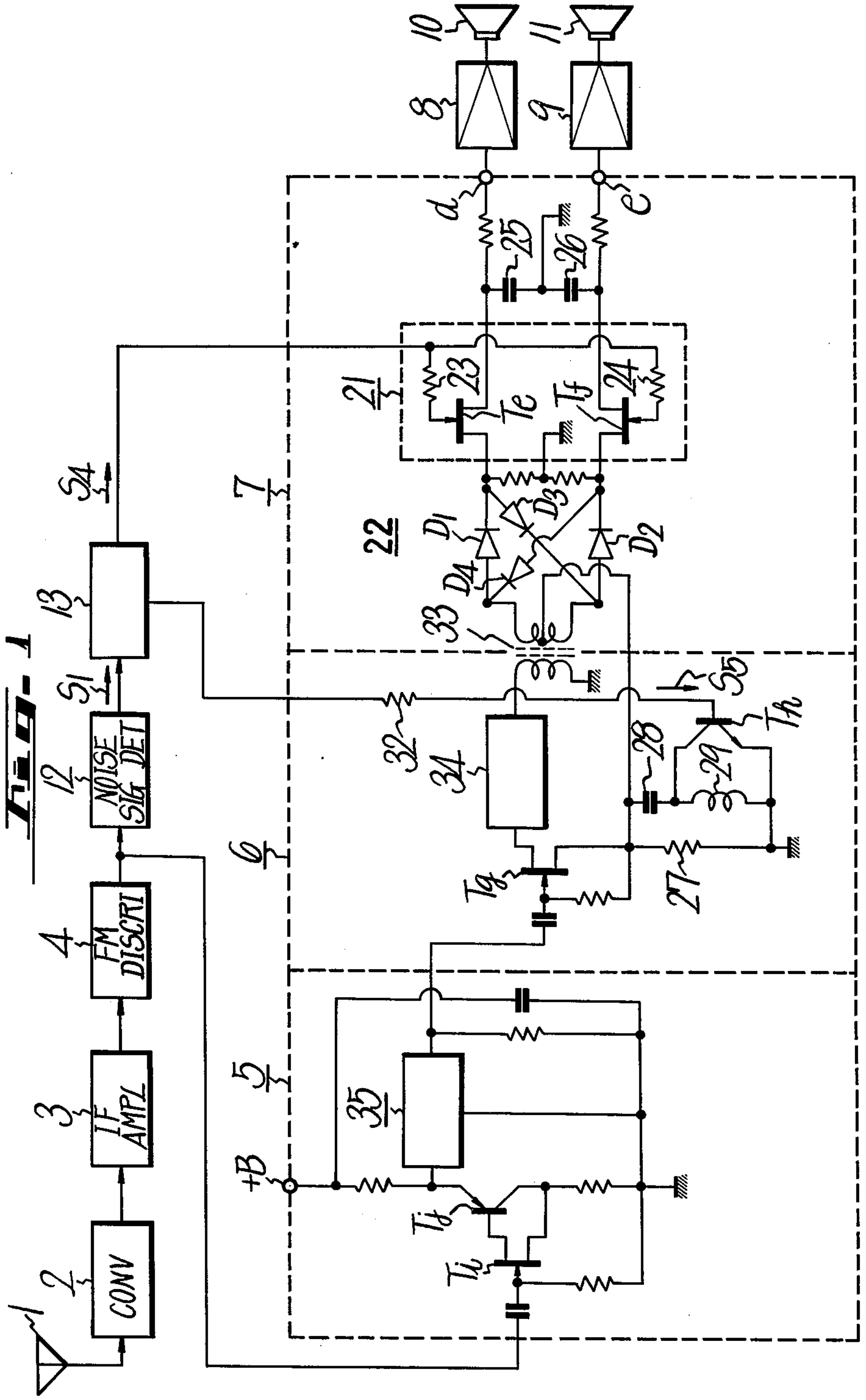
FIG. 1 is a block diagram showing one example of a noise suppression circuit for an FM receiver in accordance with this invention.

In FIG. 1 there is illustrated one example of a noise suppression circuit of my invention employed in an FM receiver which comprises an antenna 1, a frequency converter 2, an intermediate-frequency amplifier 3 comprising of a plurality of active elements such, for example, as transistors, a limiter and an FM discriminator 4. The output from the FM discriminator 4 is supplied to an FM demodulator 7 through a delay circuit 5 and a switching signal producing means 6 in a known manner. Then, right and left signals separated by the FM demodulator 7 are supplied to amplifiers 8 and 9 respectively and sounds are reproduced from loud speakers 10 and 11. The illustrated FM receiver is identical in basic construction with known types of FM receivers, except for the delay circuit 5 and minor circuit variations.

Figure 2:
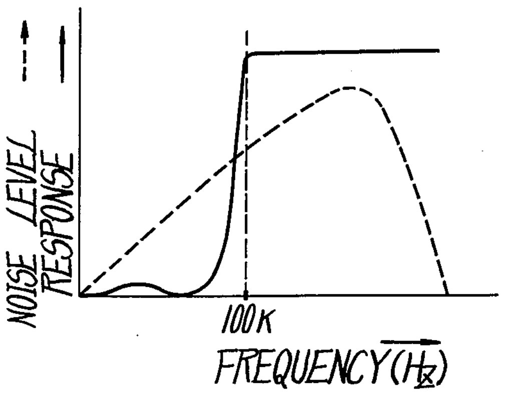
FIG. 2 is a graph, for explaining the noise suppression characteristics of FIG. 1.
Figure 3:
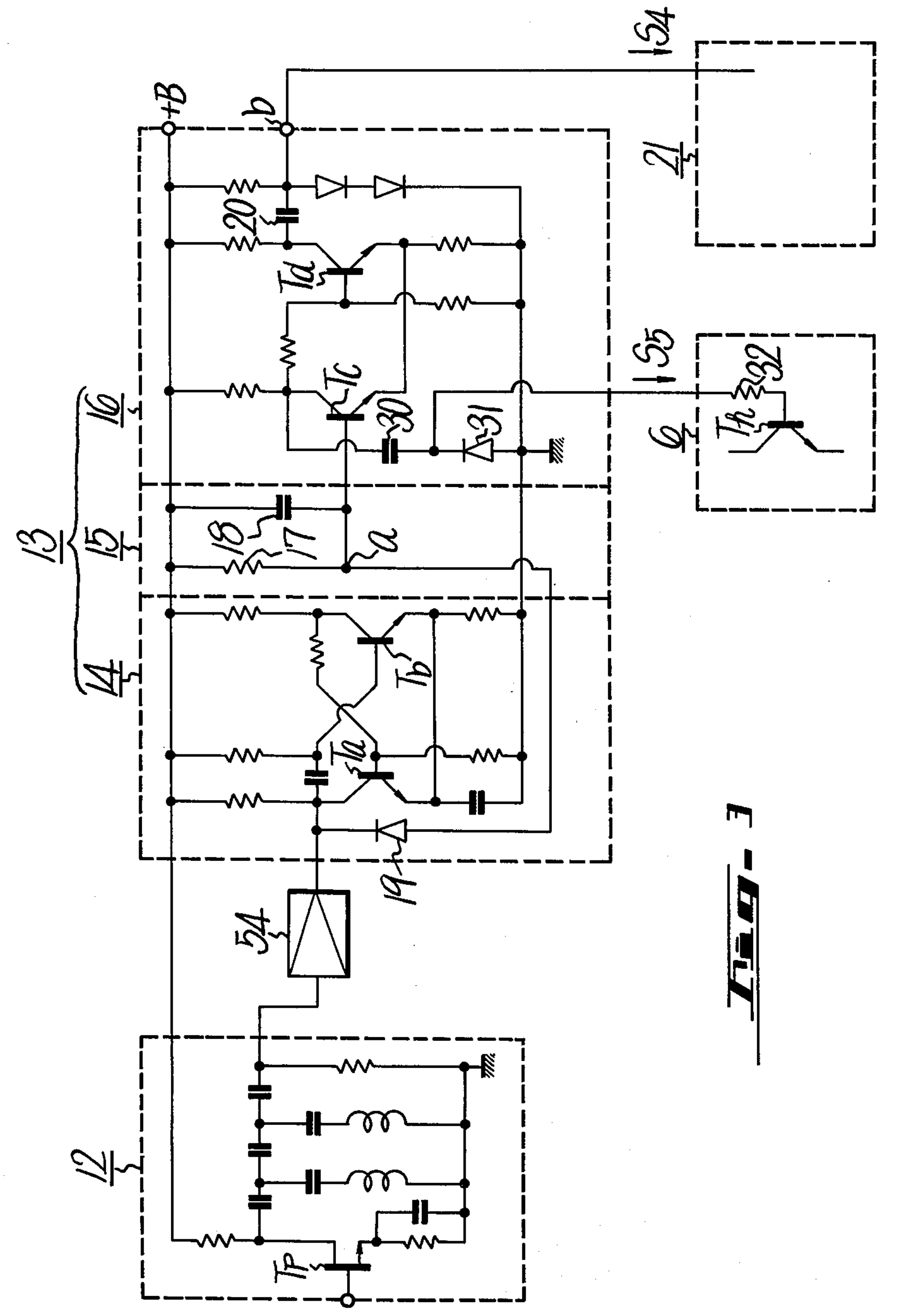
FIG. 3 is a wiring diagram showing one part of the FM receiver of FIG. 1.

In the present invention, the output from the FM discriminator 4 is further provided with a noise signal detecting circuit 12. The noise signal detecting circuit 12 is a high-pass filter such as depicted in FIG. 3 which comprises a combination of a field effect transistor $T_P$, capacitors, resistors and inductors. The noise signal detecting circuit 12 detects noise of a frequency range such as, for example, more than 100KHz in which a signal component (a composite signal composed of an R+L signal and a subcarrier signal amplitude-modulated by an R-L signal) is not contained. The frequency distribution of the impulse noise becomes the so-called triangular noise distribution which is of such a nature that the noise increases substantially in proportion to frequency but in which higher frequencies are limited by the pass bandwidth of the intermediate-frequency amplifier, so that the frequency distribution of the noise becomes such as indicated by a broken line in FIG. 2 in which noise is widely distributed in a band exceeding 100KHz. Therefore, in the present invention the lower limit of the pass band of the high-pass filter 12 is set at 100KHz as indicated by a full line.

Accordingly, the impulse noise can be detected by the high-pass filter 12.

The impulse noise detected by the high-pass filter 12 is supplied through an amplifier 54 to a control pulse signal producing circuit 13 to provide a control pulse signal corresponding to the noise signal. The circuit 13 may be formed with a monostable multivibrator 14, a waveform shaping circuit 15 and a Schmitt circuit 16 as shown in FIG. 3.

The monostable multivibrator 14 may be of such a circuit construction that the bases and collectors of two transistors T*a* and T*b* are interconnected and the output from the noise detector circuit 12 is supplied to the collector of the transistor T*a*. The waveform shaping circuit 15 is made up of a parallel connection of a resistor 17 and a capacitor 18 and the one connection point *a* therebetween is connected through a diode 19 to the collector of the transistor T*a* and the other connection point is connected to a DC power source +B. Accordingly, the waveform shaping circuit 15 is a unidirectional integrator circuit. Further, the connection point *a* is connected to the input terminal of the Schmitt circuit 16. The Schmitt circuit 16 may be of a known circuit construction, in which the aforementioned connection point *a* is connected to the base of the one transistor T*c* and the collector of the other transistor T*d* is connected to an output terminal *b* through a capacitor 20.

Figures 4A, 4B, 4C, 4D, 4E:
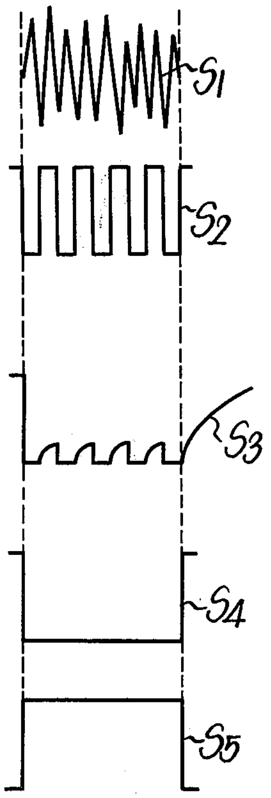
FIGS. 4A–4E are series of waveform diagrams explaining the operation of the noise suppression circuit employed in an FM receiver.

Accordingly, the monostable multivibrator 14 produces a rectangular wave $S_2$ such as shown in FIG. 4B with an impulse noise signal $S_1$ such as depicted in FIG. 4A which is produced by the noise detector circuit 12. The output signal $S_2$ thus obtained is supplied to the waveform shaping circuit 15 to derive therefrom a rectangular wave $S_3$ such as shown in FIG. 4C which is produced by the rectifying action of the diode 19 and the charging and discharging action of the capacitor 18. The rectangular wave $S_3$ serves as a trigger pulse for the Schmitt circuit 16 to actuate it. From the output terminal *b* of the Schmitt circuit 16 is derived a control pulse signal $S_4$ such as illustrated in FIG. 4D which will finally be derived from the control pulse signal producing circuit 13 for cutting off the channels of the FM receiver.

It will be noted that the monostable multivibrator 14 is not adapted to operate irrespective of the level of the impulse noise signal extracted by the noise detector circuit 12, but rather is designed to operate only at the arrival of an impulse noise signal of a level a little higher than the white noise level having a frequency range exceeding 100KHz. Further, the monostable multivibrator 14 is adapted to derive at least one rectangular wave even at the arrival of an impulse noise of an extremely short period and to follow rapidly a noise picked up. Consequently, the control pulse signal producing circuit 13 effectively responds to noise of any duration.

By cutting off the channels of the FM receiver with the control pulse signal $S_4$ which is obtained when an impulse noise gets mixed in the broadcast wave being received, its noise signal is not ever reproduced.

In the present invention, the channels of the FM receiver are cut off by controlling a gate circuit 21 which provided at a stage following switching diodes $D_1$ to $D_4$ of the stereo demodulator 7, as shown in FIG. 1.

In the gate circuit 21, for example, the sources and drains of field effect transistors T*e* and T*f* are connected to the both output transmission lines of a swtiching circuit 22 and their gates are respectively connected through resistors 23 and 24 to the output terminal *b* of the Schmitt circuit 16 forming the control pulse signal producing circuit 13. The gate circuit 21 is constructed such that the transistors T*e* and T*f* become nonconductive only when the control pulse signal $S_4$ is applied to their gates. While an impulse noise gets mixed in the broadcast wave, signals stored in capacitors 25 and 26 are supplied to terminals *d* and *e* by charging or discharging (in this case, discharging) of the capacitors 25 and 26 provided at the stage following the gate circuit 21 and when the control pulse signal $S_4$ is not derived from the control pulse signal producing circuit 13, the field effect transistors T*e* and T*f* are in the on state to supply signals to the terminals *d* and *e* as usual.

With the present invention described above, the impulse noise is detected from the final stage of the intermediate-frequency amplifier, namely from the output end of the FM demodulator in the present example, so that the selectivity characteristic and limiter effect of the intermediate-frequency amplifier can be fully utilized and the channels of the FM receiver can be cut off only when an external noise gets mixed in the FM signal. In other words, the present invention does not respond to beat interference but eliminates impulse noises without fail.

As will be apparent from the foregoing, the present invention provides a noise detecting system which is free from faulty operation due to beat interference or white noise.

However, the noise signal of high level usually much contains a component equal to a pilot signal, that is, 19KHz and, in some cases, this component gets mixed in the switching circuit 22 to disturb its switching operation or resonate with the resonance circuit of the switching signal producing means 6 to cause ringing of 19KHz, resulting in incomplete noise elimination in a short gate-off time because the duration of the ringing is long. To avoid this, the FM receiver of this invention is further provided with means for controlling the switching signal producing means 6 with a second control signal derived from the control signal producing means 13. Namely, as shown in FIG. 1, a resistor 27 and a series circuit of a capacitor 28 and a coil 29 are connected in parallel to an element for amplifying the pilot signal of 19KHz, for example, to the drain of a field effect transistor T*g* and the collector and the emitter of a transistor T*h* are connected in parallel to the coil 29. While, a capacitor 30 and a diode 31 are connected between the collector of the transistor T*c* of the Schmitt circuit 16 and ground and the connection point therebetween is connected through a resistor 32 to the base of the transistor T*h*, as depicted in FIG. 3. The drain of the transistor T*g* is connected to the mid tap of the secondary winding of a transformer 33 of the switching circuit 22 and the transformer 33 is supplied with a composite signal. Reference 34 indicates a frequency doubler for the pilot signal.

With the above arrangement, a second control pulse signal $S_5$ such as shown in FIG. 4E which is opposite in polarity to the first control pulse signal $S_4$ is derived at the connection point of the capacitor 30 and the diode 31. The second control pulse signal $S_5$ is supplied through the resistor 32 to the base of the transistor Th to conduct it for the duration of the pulse signal $S_5$. Consequently, the amplifier of 19KHz having formed a series resonance circuit with the capacitor 28 and the coil 29 becomes out of resonance with 19KHz by grounding the other end of the capacitor 28. Namely, the amplification degree of the pilot signal supplied to the frequency doubler 34 rapidly decreases because of the reduction in the operation of the resonance circuit and its gain is demultiplied to cause a substantial decrease in Q of the parallel resonance circuit for the switching circuit.

Accordingly, the switching signal supplied to the transformer 33 through the frequency doubler 34 is suppressed, so that no disturbed switching signal is supplied to the switching circuit 22, thus ensuring the avoidance of the above defect resulting from the mixing of the noise.

In the case of noise detection at the stage subsequent to the FM demodulator 4, when the noise waveform becomes dull under the influence of the passband characteristics of the intermediate-frequency amplifier 3, for example, when a noise having a pulse width of shorter than 1 microsecond is applied to the intermediate-frequency amplifier 3, the output therefrom has a pulse width of 50 microseconds and its rise-up characteristic becomes dull as compared with that when supplied to the amplifier 3. This provides a delay of about 15 to 20 microseconds from the arrival of the noise until the generation of the control pulse signal $S_4$, during which no noise detection can be achieved.

From this point of view, in the present invention a delay means having a delay characteristic of about 20 microseconds is interposed between the frequency discriminator 4 and the switching signal producing means 6 in the channels to coincide the generation of the control pulse signal $S_4$ and $S_5$ with the noise signal. The delay means includes transistors T*i* and T*j* having amplifying operation. By the amplifying operation of the transistors T*i* and T*j*, loss of a delay circuit 35 and matching loss are compensated. In this case, the amplitude and delay characteristics of the delay circuit 35 are required to be flat until a frequency of 53KHz (the upper limit of the R—L signal) so that the insertion of the dealy circuit 35 may not exert any adverse influence upon the signal system.

Figure 5:
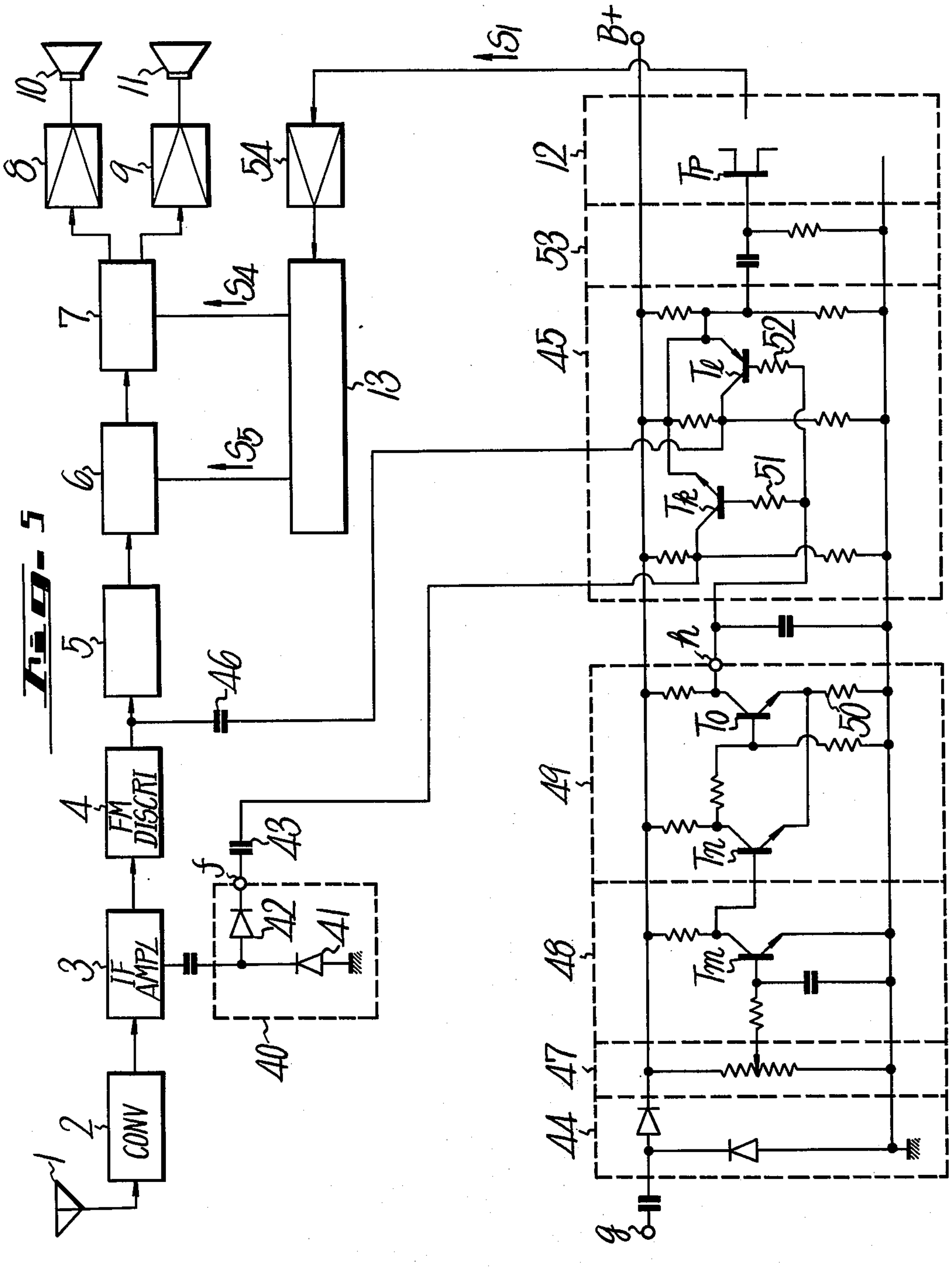
FIG. 5 is a block diagram showing a modified form of this invention.

The above example effectively avoids the impulse noise in a strong electric field and is particularly free from beat interference because of noise detection at the output stage of the intermediate-frequency stage of sufficient selectivety and limiter effect. However, when the level of the signal received is low the white noise level sometimes exceeds the signal level to actuate the noise detector circuit. FIG. 5 shows an FM receiver adapted to eliminate such a defect. In the figure, elements similar to those in FIG. 1 are marked with the same reference numerals and no detailed description will be repeated.

Figure 6:
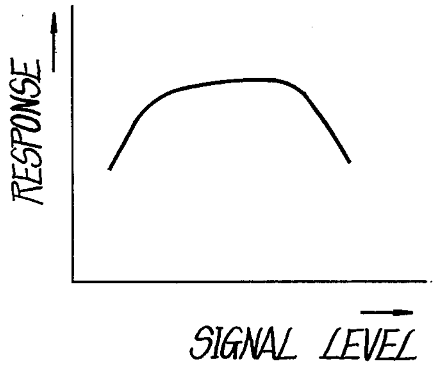
FIG. 6 is a graph for explaining it.

In FIG. 5 an intermediate-frequency signal of 10.7MHz is supplied to a second noise detector circuit 40 from an intermediate stage of the intermediate-frequency amplifier 3 having a plurality of amplifier elements, that is, limiter elements. The second noise detector circuit 40 comprises two diodes 41 and 42, so that a noise contained in the intermediate-frequency signal derived from the intermediate-frequency amplifier 3 is diode-detected by the noise detector circuit 40 and an amplitude change of the noise appears at a terminal *f*. The noise detector circuit 40 is designed to respond to a relatively low signal level as depicted in FIG. 6. The detected output is supplied through a coupling capacitor 43 to a noise signal selecting circuit 45. The noise signal selecting circuit 45 is principally made up of a transistor T*k* for switching the detected output and a transistor T*l* for switching the output of the discriminator 4 through a coupling capacitor 46. An input terminal *g* is supplied with a signal received, for example, the signal from the intermediate-frequency amplifier, which signal is detected by a detector circuit 44 and rendered into a DC signal. The DC signal thus obtained is applied to a reference potential setting means 47, which is made up of a potentiometer and the output end of which is connected to a transistor T*m* through an integrator circuit 48. The transistor T*m* operates with its base potential, so that its operation is controlled in accordance with the level of the intermediate-frequency signal, that is, the signal received. The output end of the transistor T*m* is connected to a waveform shaping circuit 49 which is provied for controlling the noise signal selecting cirucit 45. The waveform shaping circuit 49 is formed with a Schmitt circuit having the emitters of transistors T*n* and T*o* being interconnected and grounded through a resistor 50. An output end *h* of the circuit 49 is connected to the bases of the transistors Tk and Tl through resistors 51 and 52. The output of the noise signal selecting circuit 45 is connected through an integrator circuit 53 to the amplifying transistor T*p* of the first noise signal detector circuit 12 of the first example, namely to the high-pass filter, and to the control signal producing circuit 13 through the amplifier 54.

A description will be given of the operation of the example of FIG. 5. A noise component contained in the intermediate-frequency signal derived from the intermediate stage of the intermediate-frequency amplifier 3 is amplitude-detected by the second noise detecting circuit 40 and the detected output is fed to the collector of the transistor T*k*. Further, the output from the discriminator 4 is similarly applied to the collector of the transistor T*l* through the coupling capacitor 46. While, when the level of the received signal is low, the DC level obtained by detecting the received signal with the detector means 44 is too low to conduct the transistor T*m*. Consequently, the transistor T*n* of the circuit 49 becomes conductive, while the other transistor T*o* remains nonconductive, so that the transistor T*k* of the noise signal selecting circuit 45 remains conductive and the transistor T*l* nonconductive. Accordingly, only the noise signal detected by the detector circuit 40 is selected by the noise signal selecting circuit 45 and then supplied to the control signal producing circuit 13 through the high-pass filter. The reason why the noise signal derived from the second noise detector circuit 40 is passed through the high-pass filter, namely the first noise detector circuit 12 is to remove received signal components due to multiple paths. With the noise signal detected by the second noise detector circuit 40, the circuit 13 is actuated in the same manner as that above described in connection with the first example. Namely, the gate circuit 21 is cut off only for the period of the noise signal and, at the same time, the resonance of the resonance circuit for the pilot signal is shifted. Accordingly, the white noise which causes a faulty operation in the first example is detected by the AM detection system to avoid the faulty operation. Further, in the scond example, when the received signal level is high, the output from the detector circuit 44 also increases to conduct the transistor Tm, so that the transistors T*n* and T*o* are respectively reversed to make the transistors T*k* and T*l* of the noise signal selecting circuit 45 nonconductive and conductive respectively. Accordingly, only the output from the discriminator 4 is supplied to the first noise detector circuit 12, providing the same operations as those in the first example.

Thus, the present invention enables effective noise elimination by changing over the noise detecting means in accordance with the level of the received signal.

Although the noise signal selecting circuit 45 is provided between the first and second noise detector circuits 12 and 40 in the foregoing example, it is also possible, of course, to connect the first noise detector circuit 12 to the input end of the noise signal selecting circuit 45.

It will be apparent that many modifications and variations may be effected without departing from the scope of the novel concepts of this invention.

I claim as my invention:

1. In an FM receiver which includes an FM discriminator connected to an intermediate-frequency amplifier having a limiter, and a stereo demodulator circuit connected to said discriminator for reproducing stereophonic audio signals, the combination comprising a gate circuit connected to an output stage of said stereo demodulator circuit, a noise signal detector circuit connected to said discriminator for detecting a noise signal of a frequency higher than that of a composite stereo signal, means for producing a control signal by said noise signal derived from said noise signal detector circuit to control said gate circuit to cut it off with said control signal when said noise signal is detected, a switching signal producing means for producing the switching signal to be supplied to said demodulator circuit, the switching signal producing means including a resonance circuit resonant with a pilot signal, the resonance of the resonance circuit being changed with said control signal, said control signal producing means comprising a monostable multivibrator operable with said noise signal and a waveform shaping circuit causing the output of the multivibrator to form a rectangular wave of a width corresponding to the duration of the noise signal.

2. In an FM receiver of the type set forth in claim 1 and having the combination therein defined wherein said waveform shaping circuit consists of an integrator circuit and a Schmitt circuit.

3. In an FM receiver which includes an FM discriminator connected to an intermediate-frequency amplifier having a limiter, and a stereo demodulator circuit connected to said discriminator for reproducing stereophonic audio signals, the combination comprising a gate circuit connected to an output stage of said stereo demodulator circuit, a noise signal detector circuit connected to said discriminator for detecting a noise signal of a frequency higher than that of a composite stereo signal, means for producing a control signal by said noise signal derived from said noise signal detector circuit to control said gate circuit to cut it off with said control signal when said noise signal is detected, a switching signal producing means for producing the switching signal to be supplied to said demodulator circuit, the switching signal producing means including a resonance circuit being changed with said control signal, a second noise detector circuit connected to said intermediate-frequency signal, and selecting means for selectively supplying said control signal producing circuit with the noise signal contained in said intermediate-frequency signal and the noise signal contained in the output signal of the discriminator.

4. In an FM receiver of the type set forth in claim 3 and having the combination therein defined wherein said selectively means is a switching circuit operable in accordance with the level of a signal being received.

5. In an FM receiver of the type set forth in claim 4 and having the combination therein defined wherein said switching circuit consists of a first switching transistor for supplying the control signal producing circuit with a signal containing a noise and derived from the intermediate-frequency amplifier and a second switching transistor for supplying the control signal producing circuit with a signâl containing a noise and derived from the discriminator, the first and second switching transistors being differentially operated in accordance with the level of the received signal.

6. In an FM receiver of the type set forth in claim 3 and having the combination therein defined wherein said noise detector circuit is a diode detector.

7. In an FM receiver which includes an FM discriminator connected to an intermediate-frequency amplifier and a stereo demodulator circuit connected to said discriminator for reproducing sterophonic audio signals, the combination comprising: a gate circuit connected to an output stage of said stereo demodulator circuit, a first noise signal detector circuit connected to said intermediate-frequency amplifier for detecting a first noise signal mixed with an intermediate-frequency signal in a relatively weak electric field, a second noise signal detector circuit connected to said discriminator for detecting a second noise signal mixed with the audio signals in a relatively strong electric field, selecting means connected to said first and second noise signal detector circuits for selecting one of said first and second noise signals, means connected to said selecting means for producing a control signal in response an output signal derived from said selecting means, means for using said control signal to cut off said gate circuit, and means connected to an output stage of said gate circuit for storing audio signals at the last-occuring value before said gate circuit is cut off and for supplying the stored signal to an output terminal of said FM receiver while said gate circuit is cut off.

8. In an FM receiver as described in claim 7 the combination wherein said control signal producing means includes an integrator circuit and a Schmidt circuit to form a rectangular wave of width corresponding to the duration of the noise signal.

9. In an FM receiver as described in claim 8 the combination wherein said control signal producing means further includes a monostable multivibrator operable by said noise signal.

10. In an FM receiver as described in claim 9 the combination which further includes a delay means connected between said discriminator and said demodulator circuit for causing said control signal to coincide in time with that of the signal passing through said demodulator circuit.

11. In an FM receiver which includes an FM discriminator connected to an intermediate-frequency amplifier and a stereo demodulator circuit connected to said discriminator for reproducing stereophonic audio signals the combination comprising: a gate circuit connected to an ouput stage of said stereo demodulator circuit a control signal producing means which includes, a noise signal detector circuit connected to said intermediate-frequency amplifier for detecting a noise signal mixed with an intermediate-frequency signal means for producing a control signal in response to detection of noise in said noise signal detector circuit, said control signal producing means including a monostable multivibrator operable by said noise signal and a waveform shaping circuit consisting of an integrator circuit and a Schmitt circuit for causing the output of the multivibrator to form a rectangular wave of a width corresponding to the duration of the noise signal means for using said control signal to cut off said gate circuit, and means connected to an output stage of said gate circuit for storing audio signals at the last-occurring value before said gate circuit is cut off and for coupling the stored signal to an output terminal of said FM receiver while said gate circuit is cut off.

12. In an FM receiver as described in claim 11 having the combination which further includes a delay means connected between said discriminator and said demodulator circuit for causing said control signal to coincide in time with that of the signal passing through said demodulator circuit.

13. In an FM receiver which includes an FM discriminator connected to an intermediate-frequency amplifier and a stereo demodulator circuit connected to said discriminator for reproducing stereophonic audio signals the combination comprising: a gate circuit connected to an output stage of said demodulator circuit, a noise signal detector circuit connected to said discriminator for detecting a noise signal, means for producing a control signal in response to detection of noise in said noise signal detector circuit, said control signal producing means comprising a monostable multivibrator operable by said noise signal and a waveform shaping circuit consisting of an integrator circuit and a Schmidt circuit for causing the output of the multivibrator to form a rectangular wave of a width corresponding to the duration of the noise signal, means for using said control signal to cut off said gate circuit, and means connected to an output stage of said gate circuit for storing audio signals at the last occurring value before said gate circuit is cut off and for supplying the stored signal to an output terminal of said FM receiver while said gate circuit is cut off.

14. In an FM receiver as described in claim 13 the combination which further includes a delay means connected between said discriminator and said demodulator circuit for causing said control signal to coincide in time with that of signal passing through said demodulator circuit.

* * * * *